(12) United States Patent
Bhansali et al.

(10) Patent No.: US 7,456,638 B2
(45) Date of Patent: Nov. 25, 2008

(54) MEMS BASED CONDUCTIVITY-TEMPERATURE-DEPTH SENSOR FOR HARSH OCEANIC ENVIRONMENT

(75) Inventors: Shekhar Bhansali, Tampa, FL (US); Lawrence C. Langebrake, Seminole, FL (US); Shreyas Bhat, Wilsonville, OR (US)

(73) Assignee: University of South Florida, Tampa, FL (US)

( * ) Notice: Subject to any disclaimer, the term of this patent is extended or adjusted under 35 U.S.C. 154(b) by 0 days.

(21) Appl. No.: 11/379,270

(22) Filed: Apr. 19, 2006

(65) Prior Publication Data

US 2007/0018650 A1    Jan. 25, 2007

Related U.S. Application Data

(60) Provisional application No. 60/672,802, filed on Apr. 19, 2005.

(51) Int. Cl.
G01R 27/02 (2006.01)
G01L 9/06 (2006.01)

(52) U.S. Cl. .......................... 324/693; 324/446; 73/721

(58) Field of Classification Search ................. 324/693, 324/446; 73/721
See application file for complete search history.

(56) References Cited

U.S. PATENT DOCUMENTS

| | | | | |
|---|---|---|---|---|
| 4,238,804 A | * | 12/1980 | Warren | 347/81 |
| 4,646,070 A | * | 2/1987 | Yasuhara et al. | 340/603 |
| 5,446,437 A | * | 8/1995 | Bantien et al. | 338/25 |
| 2004/0232923 A1 | * | 11/2004 | Farruggia et al. | 324/694 |
| 2005/0104607 A1 | * | 5/2005 | Byington et al. | 324/693 |
| 2005/0200056 A1 | * | 9/2005 | Conti | 266/89 |
| 2005/0274191 A1 | * | 12/2005 | Hasegawa et al. | 73/721 |
| 2006/0037390 A1 | * | 2/2006 | Nakano et al. | 73/204.21 |
| 2007/0018652 A1 | * | 1/2007 | Broadbent et al. | 324/446 |

* cited by examiner

*Primary Examiner*—Vincent Q. Nguyen
*Assistant Examiner*—John Zhu
(74) *Attorney, Agent, or Firm*—Micahel M. McGaw; Smith & Hopen, P.A.; Molly L. Sauter

(57) ABSTRACT

A MEMS-based silicon CTD sensor for ocean environment is presented. The sensor components are a capacitive conductivity sensor, a gold doped silicon temperature sensor, and a multiple diapghram piezoresistive pressure sensor. The sensor elements have further been packaged to protect them from harsh marine environment. The sensor components showed good linear response, resolution and mechanical integrity to the harsh ocean environment.

18 Claims, 11 Drawing Sheets

MEMS BASED CONDUCTIVITY-TEMPERATURE-DEPTH SENSOR FOR HARSH OCEANIC ENVIRONMENT

CROSS REFERENCE TO RELATED APLICATIONS

This application claims priority to currently pending U.S. Provisional Patent Application 60/672,802, entitled, "Conductivity Sensor for Marine Applications", filed Apr. 19, 2005.

FIELD OF INVENTION

This invention relates to sensors for measuring conductivity, temperature and depth in oceanographic environments.

BACKGROUND OF INVENITON

In recent years, significant investigation has been devoted to measuring ocean parameters such as pressure/mixed layer depth, salinity and temperature. These variables critically influence the physical, chemical and biological processes in the ocean. These processes range from changing the stengths of ocean currents to affecting coral growth to influencing global warming. Historically, marine researchers have been unable to measure ocean parameters continuously throughout large volumes of sea-space and over large time spans. The accepted methods for measuring the ocean parameters usually require the use of research vessels, Autonomous Underwater Vehicles (AUV) or Remote Operated Vehicles (ROV), which can only sense local environmental variables at a single point in space and time. The use of multiple vehicles improves sampling frequency and overall measurement quality. However, the gain from higher spatial sampling frequency has been traditionally related to the number of additional vessels used. More support vessels, whether AUVs or ships, add a significant cost. While remote sensing and in-situ buoy systems have provided part of the solution to the increased cost associated with adding vessels, both have limitations. Thus, there a need for an inexpensive, yet highly accurate and reliable tool to continuously measure large volumes of sea-space over long time spans (weeks or months). We present a system that can overcome the limitations in the deployment of environmental measuring parameters for sea-space observations. We present the design, fabrication and testing of a Micro-Electro-Mechanical-System (MEMS) based Conductivity-Temperature-Depth (CTD) sensor. MEMS based sensors offer miniaturization, which is useful for distributed network with large and dynamic sampling volume and for high accuracy of measurement.

SUMMARY OF INVENTION

In accordance with the present invention is provided an apparatus for measuring conductivity, temperature and depth of a liquid. In an advantageous embodiment the apparatus includes a parallel plate capacitive based conductivity microsensor for measuring the conductivity of the liquid, a doped silicon resistive temperature microsensor for measuring the temperature of the liquid and a multiple diaphragm piezoresistive microsensor for measuring the pressure of the liquid.

In a particular embodiment the parallel plate capacitive based conductivity microsensor has an upper chargeable plate and a lower chargeable plate positioned in parallel relation to each other and separated by a plate gap such that the liquid to be measured flows within the plate gap. The upper chargeable plate and a lower chargeable plate can further include two guard rings, each of the two guard rings positioned to surround one of each of the parallel plates.

In a specific embodiment the upper parallel plate further has two copper plates fabricated on a substrate wherein each of the copper plates measures about 10 mm by 10 mm and are about 250 μm thick, and are separated from each other by a spacing of about 1 mm. In an additional embodiment the lower parallel plate is a copper plate fabricated on a substrate in certain embodiments the two guard rings are about 5 mm thick and separated from the parallel plates by about 400 μm.

In addition to the electrodes the conductivity microsensor further includes supply circuitry coupled to the two parallel plates and output circuitry coupled to the two parallel plates for measuring the conductivity of the liquid.

In advantageous embodiments the plate gap is provided by strips of silicon wafer bonded between the substrate of the upper parallel plate and the substrate of the lower parallel plate.

In a particular embodiment the parallel plates are coated with a polymer to physically and electrically isolate them from the liquid. In certain embodiments the doped silicon resistive temperature microsensor is doped with gold.

The doped silicon resistive temperature microsensors can further include an n-type silicon substrate area diffused with gold regions using e-beam evaporation and heating. In certain embodiments the apparatus can further include ohmic contacts positioned to contact the gold diffused regions.

The present invention also includes a multiple diaphragm piezoresistive pressure microsensor to detect the deflection of the membranes, induced by the applied pressure of the liquid and converts the deflections into an electrical output using a piezoresistor to measure the pressure of the liquid. The pressure measurement of the liquid can be converted to depth according to the formula:

$$P = \rho h g$$

where, P is the pressure, $\rho$ is the density of water, h is the depth in water and g is acceleration due to gravity.

In certain embodiments the multiple diaphragm piezoresistive pressure microsensor further includes four square silicon diaphragms of about 1000 mm in area supported by a thicker square diaphragm of about 1500 mm in area, the silicon diaphragms having a thickness of between about 5 μm and 30 μm and fabricated on a common substrate to measure linearly the pressure range of the liquid.

In a specific embodiment the piezoresistors are small regions of silicon diffused with p-type or n-type elements that undergo a change in resistance due to the applied pressure on the diaphragms. The change in resistance of the piezoresistor can be measured as a voltage output by means of a wheatstone bridge.

In order to communicate the collected measurements from the microsensors, the present invention includes a data-acquisition and processing system connected to receive measurement signals from the conductivity microsensor, the temperature microsensor and the pressure microsensor. To protect the apparatus from the environment a substantially watertight casing can be employed.

BRIEF DESCRIPTION OF THE DRAWINGS

For a fuller understanding of the invention, reference should be made to the following detailed description, taken in connection with the accompanying drawings, in which.

DETAILED DESCRIPTION OF THE PREFERRED EMBODIMENT

The all-silicon MEMS multi sensor consists of a capacitive based conductivity sensor, a gold doped temperature sensor and bulk micromachined piezoresistive pressure/depth sensor. These sensors are capable of operating over a wide dynamic range (0-500 m) with a resolution better than 1%. The advantages of using MEMS based silicon sensors are: 1) negligible creep and fatigue from hysterisis, 2) capable of integration and batch fabrication and 3) easily interface to electronic circuits.

A. Conductivity Sensor

Figure 1:
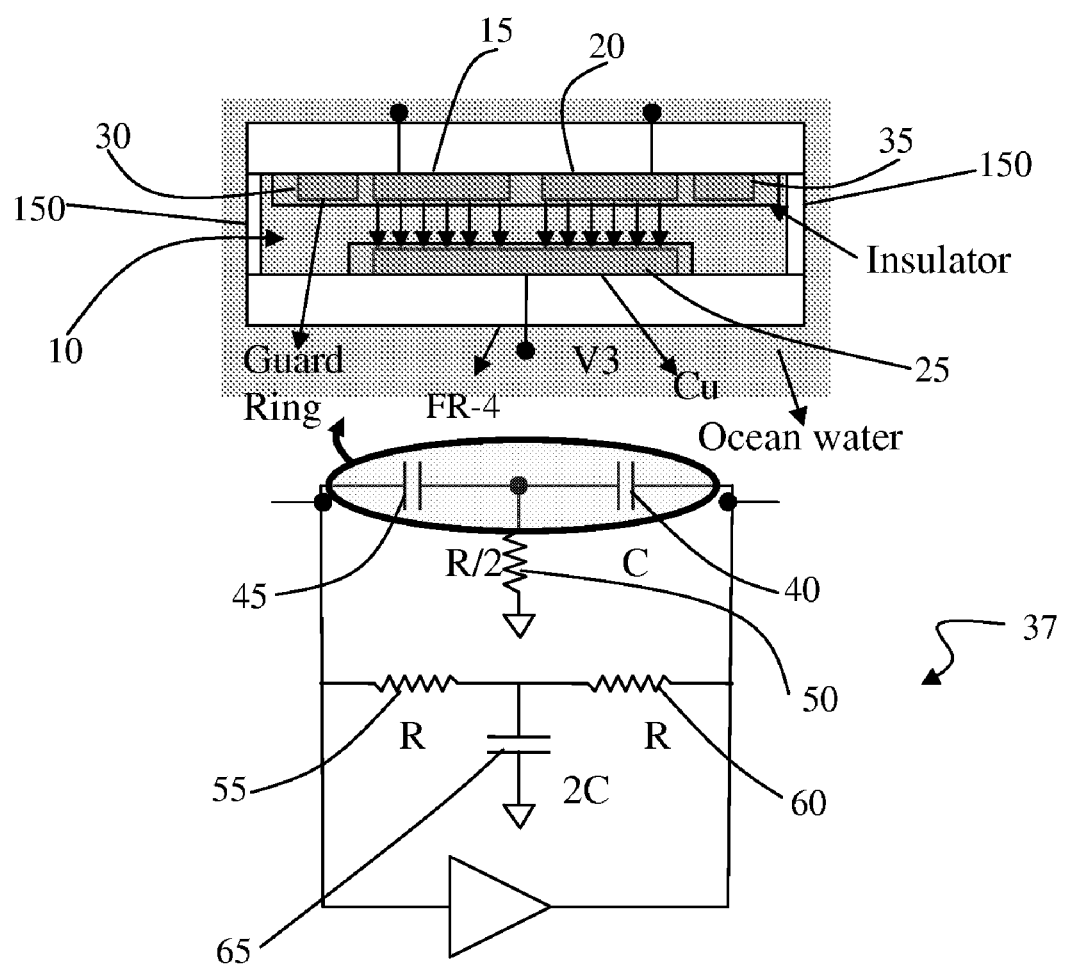
FIG. 1 is a schematic diagram illustrating the parallel-plate arrangement for measuring conductivity.

Conventional conductivity sensors consist of toroidal coils for measurements. An inherent drawback of such system is the external field. A significant portion of the measuring field is external to the device and hence, any particle/field in the vicinity of the device tends to alter the measuring field resulting in measurement errors. The problem of external fields can be overcome by making use of a parallel two plate arrangement where the test specimen (ocean water) is allowed to flow through the plate gap. FIG. 1 illustrates the parallel plate arrangement for measuring conductivity of water. In this capacitive arrangement, most of the electric field 10 is confined to the region between the two charged plates 15, 20, 25. The only fields external to such a system are the fringe fields at the corners of the plates 15, 20, 25. These are minimized by incorporating guard rings 30, 35 around the plates 15, 20, 25. The guard rings 30, 35 divert the fringe fields from the area of interest. In particular, the capacitor arrangement forms a part of a larger twin-T oscillator circuit 37. The twin-T oscillator 37 uses a high-pass arm consisting of two equal capacitors 40, 45 and a resistor 50, and a low pass arm consisting of two resistors 55, 60 and a capacitor 65. In addition, the separation between the charged plates 15, 20, 25 establishes a plate gap with is provided by placing strips of silicon wafer 150 bonded between the substrate of the upper parallel plate and the lower parallel plate.

For sustained oscillations, the capacitors 40, 45, 65 and resistors 50, 55, 60 should be matched according to the relation, $R_1=R_2=2R_3=R$ and $C_1=C_2=C_3/2=C$. The frequency of oscillation is thus, controlled by the resistors 50, 55, 60 and capacitors 40, 45, 65 in the twin-T arrangement 37, and given by the expression, $$F=1/2*\pi*R*C \qquad (2.1)$$

Thus, the change in concentration of the analyte changes the dielectric constant of the solution. This is because of the fact that when salts are added to water, 'hydration' of the salt ions takes place and it becomes harder for the ions to orient themselves in the direction of the electric field. This change in dielectric constant corresponds to a change in the capacitance of the sensor, which in turn corresponds to a shift in the oscillator's frequency.

B. Temperature Sensor

Unlike conventional Resistance Temperature Detectors (RTD), which are expensive and require elaborate packaging, our approach uses a low-cost, simple, packaged, board range gold doped silicon temperature sensor.

The temperature sensing principle is based on the phenomena of resistivity change in bulk Si with temperature. In order to construct a sensor with high resolution and sensitivity, the resistivity of silicon was increased by controlled addition of deep impurities. The resistivity of silicon substrate was increased by controlled co-doping of Si with a deep donor (DD) and a deep acceptor (DA). Almost all transition metals such as copper, gold, iron are known to introduce a pair of DD and DA in the silicon bandgap. Gold (Au) is a stable material (density of 19.3 g/cm$^3$ and melting point of 1060° C., but very fast diffuser and forms a deep-impurity level in silicon. Au dissolves substitutionally and diffuses interstitially in silicon at temperatures above 800° C., also known as the kick-out mechanism. The resistivity of pure silicon becomes high when the gold concentration exceeds the shallow donor concentration. This makes temperature measurement highly sensitive.

C. Pressure/Depth Sensor

Several techniques have been routinely used in the past to measure pressure in the marine environment. In general, the pressure sensor design is based on a flexible membrane as the spring element for the sensing pressure. The deflection of the membrane, induced by the applied pressure, is converted into an electrical output through a component that is sensitive to diaphragm deflection (capacitive coupling) or associated stresses (piezoresistors, strain gauges). The temperature compensated pressure measurement can be readily converted to depth using $$P=\rho h g \qquad (2.2)$$

where, P is the pressure, ρ is the density of water, h is the depth in water and g is acceleration due to gravity. The piezoresistive pressure sensors were one of the first MEMS products put into mass production. Piezoresistive pressure sensors using silicon as the structural material and piezoresistivity as sensing mechanism are fabricated either by bulk or by surface micromachining techniques.

In this work, a silicon piezoresistive bulk-micromachined pressure/depth sensor of varying diaphragm thickness (5-30 μm) was fabricated on a single substrate to measure linearly the pressure range. Each individual sensor was designed as a square diaphragm (1000 micrometer) supported by a thicker square diaphragm (1500 micrometer) to transfer the larger stresses to the outer thicker rim and to have a highly sensitive and large operating range.

Figure 2:
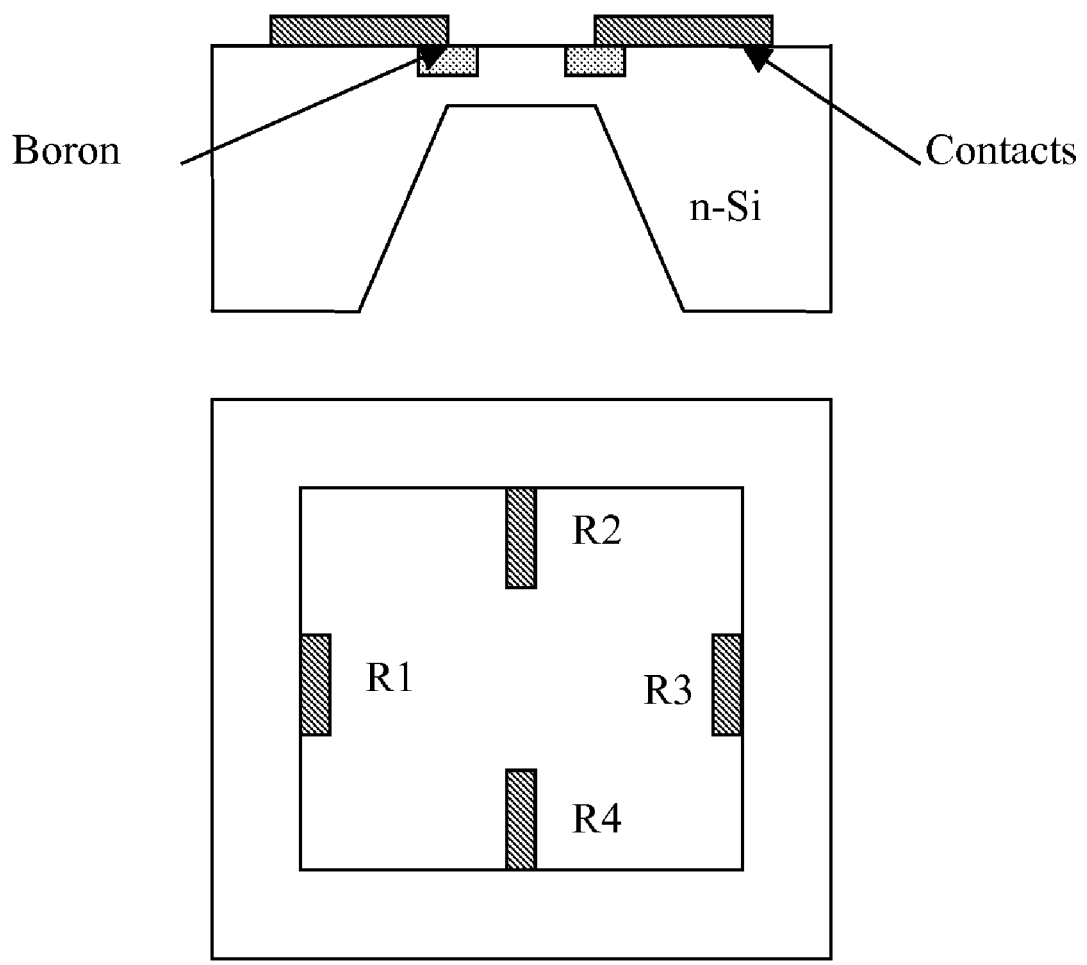
FIG. 2 shows a cross-sectional and top view of a single diaphragm piezoresistive pressure sensor.

In this method of pressure measurement the pressure is applied to one side of a deformable diaphragm. The deformation is sensed on the diaphragm using piezoresistors. In general, piezoresistivity is a material property in which the bulk resistivity is influenced by the mechanical stress applied to the material. The resistivity of a material depends on the internal atom positions and their motions. Strains change these arrangements and hence, the resistivity. High piezoresistivity exhibited by single crystal silicon, combined with its excellent mechanical properties, makes silicon particularly suited for the fabrication of electromechanical pressure sensors with substantially enhanced output. FIG. 2 shows a prior art silicon based pressure sensors 70 consisting of a silicon diaphragm 75 with small regions 80, 85 diffused with p-type or n-type elements (R1, R2, R3 and R4) 80, 85, 101, 102 that act as piezoresistors 80, 85, 101, 102. These piezoresistors 80, 85, 101, 102 undergo a change in resistance due to the applied pressure.

When a differential pressure is applied across the device, the thin diaphragm will deflect either downward or upward, resulting in expansion or compression of the piezoresistors. The resistance change caused by this stress is measured as a voltage output by means of a wheatstone bridge configuration. Thus, the output response from the wheatstone bridge is proportional to the applied differential pressure.

Figure 3:
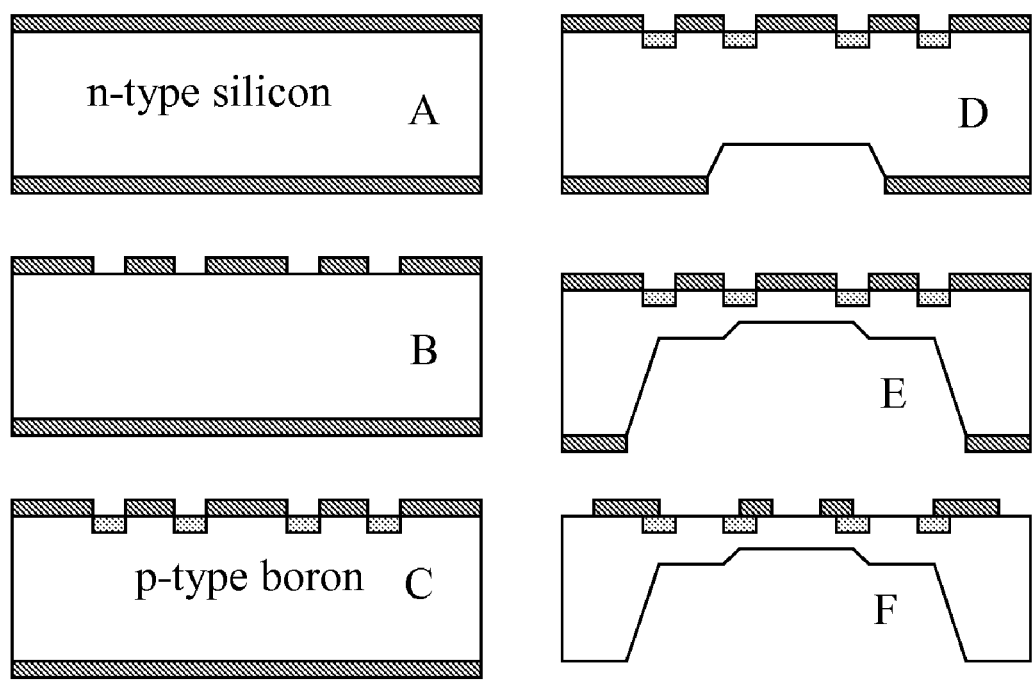
FIG. 3 is an illustration of the pressure sensor fabrication sequence.

With reference to FIG. 3, a silicon piezoresistive bulk-micromachined pressure/depth sensor of varying diaphragm thickness (5-30 μm) was fabricated on a single substrate to measure linearly the pressure range. Each individual sensor was designed as a square diaphragm (1000 micrometer) 110 supported by a thicker square diaphragm (1500 micrometer) 115 to transfer the larger stresses to the outer thicker rim and to have a highly sensitive and large operating range.

Fabrication of the MEMS-Based CTD Sensor

The different sensor components were fabricated using conventional MEMS/silicon micromachining techniques. A prototype conductivity sensor was first constructed to validate the design issues. The conductivity sensor was fabricated on a pre-sensitized single side copper FR-4 substrate, having a 250 μm thick copper layer. Copper plates (each measuring 10 mm×10 mm), were patterned adjacent to each other with 1 mm spacing. The guard rings 5 mm thick were incorporated around the measuring plates and was separated from them by 400 μm. These were then placed in parallel to the third plate. A gap was maintained by bonding, two strips of silicon wafer between the two substrates. The plates are patterned on the substrate using standard PCB fabrication techniques. The contacts were made by soldering the wires to the copper plates. The plates were physically and electrically isolated from the medium, by coating them with a 10 μm thick polymer.

Figure 10:
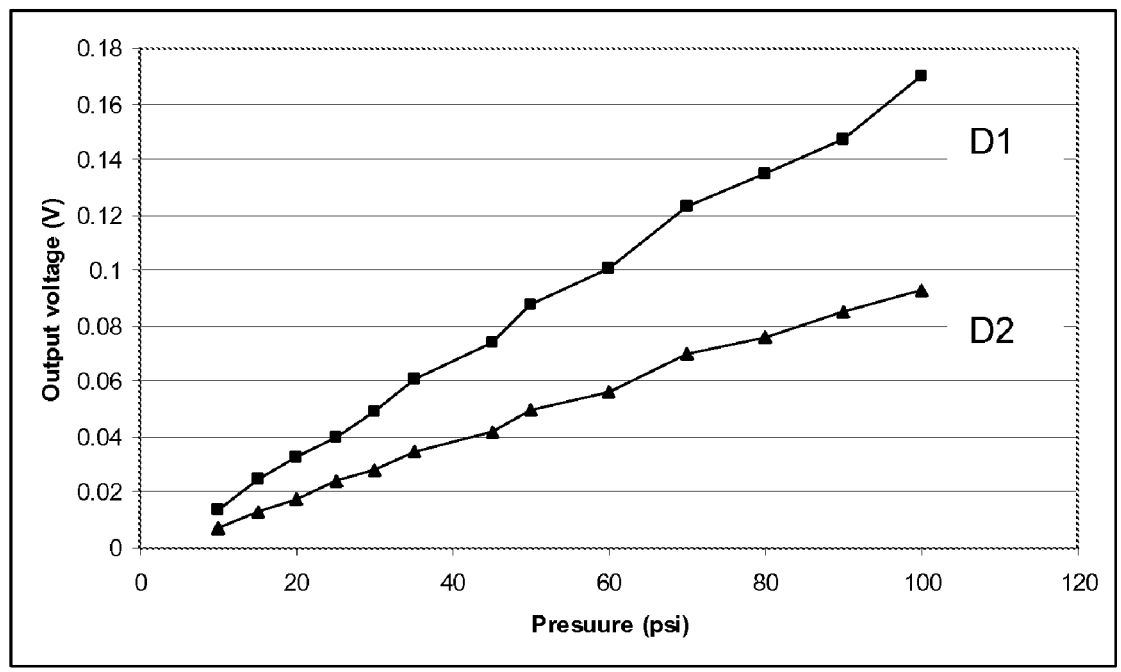
FIG. 10 is a plot showing output voltage in response to variation in pressure. (D1) 1500 μm in length, 35 μm thick, (D2) 1000 μm in length, 25 μm in width.
Figure 11:
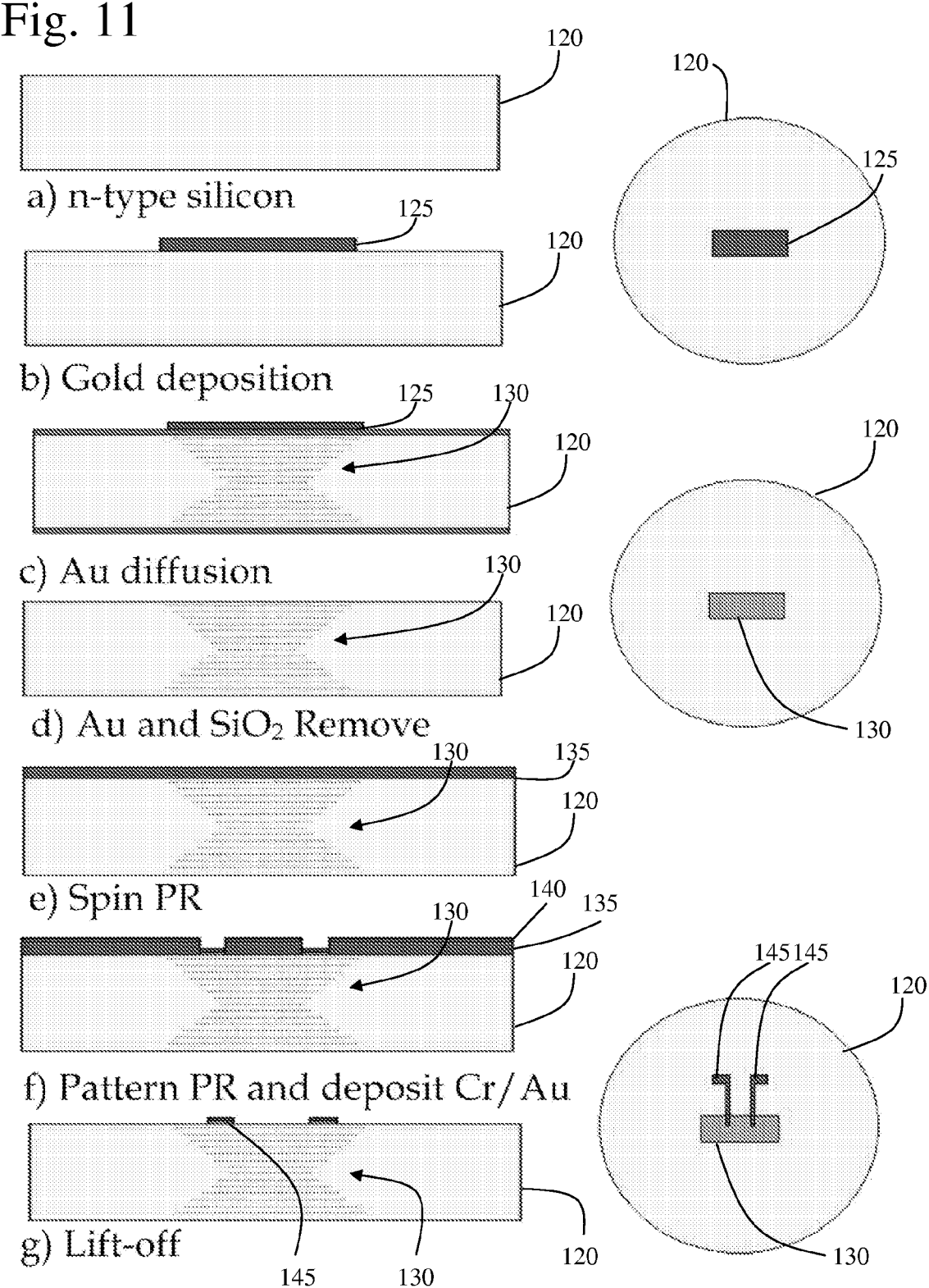
FIG. 11 illustrates the fabrication process of the temperature sensor in accordance with an embodiment of the present invention.

With reference to FIG. 10, in the case of temperature sensor, a n-type (phosphorous doped) silicon substrate 120 was used. This was followed by deposition of 25 nm of Au 125 on a 1 cm×0.5 cm area of silicon using e-beam evaporation technique. It was found that this area was sufficient to give high resistance and hence high resolution. Next, diffusion 130 was done in an oxygen rich furnace at 1100° C. This was followed by Au etch to remove any surface Au and oxide etch for 20 minutes. Then, ohmic contacts 145 were patterned by standard photolithography technique 135, 140 on the Au diffused regions.

The fabrication of piezoresistive pressure sensor involves the fabrication of a silicon diaphragm by bulk etching of (100) n-type silicon using timed etching approach. The piezoresistors were formed by diffusing p-type dopant (boron) close to the edges of the diaphragm. The piezoresistors were connected in a wheatstone bridge configuration. Two piezoresistors are oriented so that they can sense stress in a direction parallel to the current flow, and other two are placed to sense stress perpendicular to current flow. FIG. 3 shows the cross-sectional fabrication sequence for a multiple diaphragm pressure sensor. This type of pressure sensor has two diaphragms of thickness 25 and 35 μm respectively and four piezoresistors in each diaphragm to sense the deformation. First, the n-type silicon is oxidized (A), then by standard photolithography and etching techniques oxide areas are opened up for boron diffusion (B). Next, p-type element (boron) is diffused by ion-implantation and annealed (C), this followed by oxide etching for formation of the diaphragm (D), Two diaphragms 110, 115 of different thickness were formed by silicon bulk micromachining technique (E). Finally, the contacts are formed for measurements purposes (F).

Figure 4:
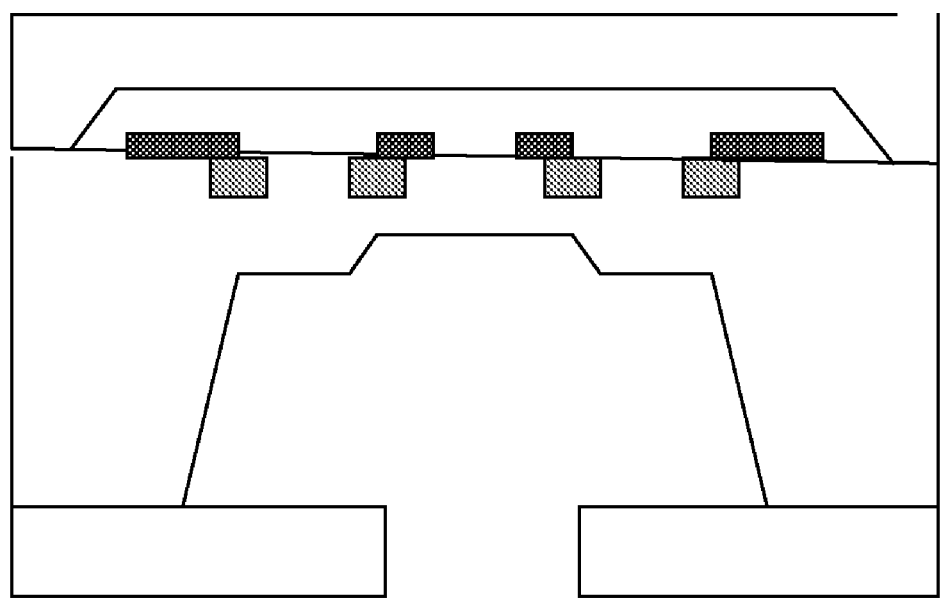
FIG. 4 is a schematic showing the packaged piezoresistive pressure sensor.
Figure 5:
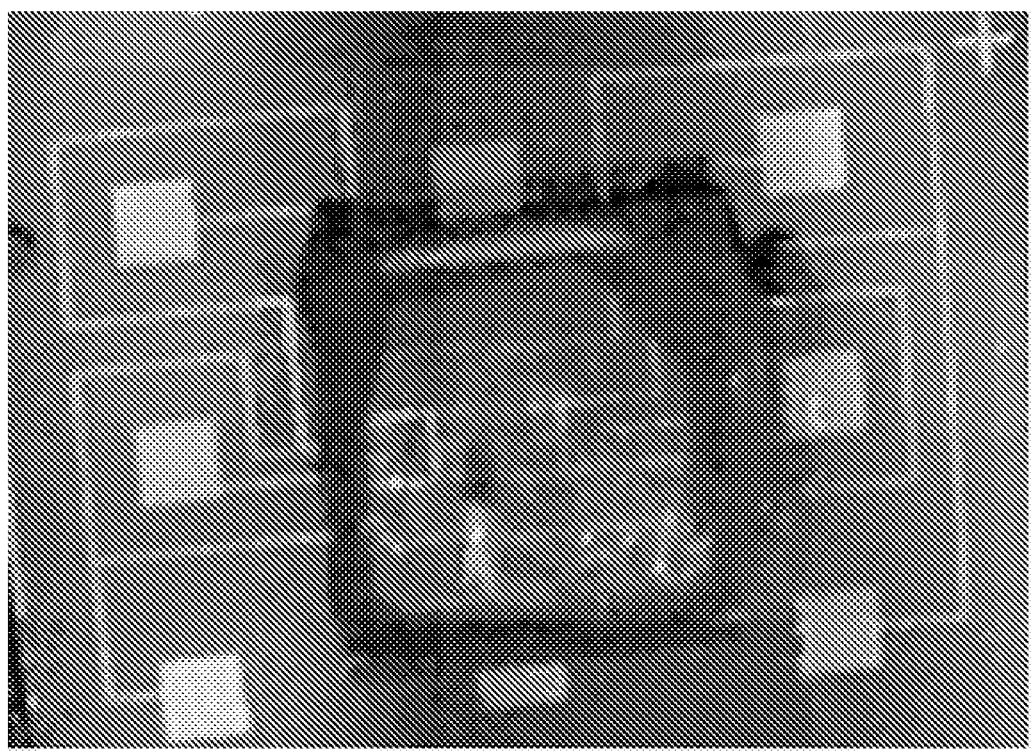
FIG. 5 is a photograph of a packaged multiple diaphragm piezoresistive pressure sensor.

The next step in the pressure sensor fabrication is to form the package to protect the sensor for the harsh ocean environment. This was accomplished by forming a cavity above the diaphragm using a thick pyrex glass. FIG. 4 shows the schematic of the package and FIG. 5 shows actual packaged pressure sensor. Next, the interconnections were drawn out of the bond pads by filling the vias with conductive epoxy. This was then flip-chipped on to a bottom board with ports for sensing pressure. The whole assembly was coated with protective paint, Lumiflon®. This protects the device from harsh environmental conditions.

Performance of the MEMS-Based CTD Sensor

Figure 6:
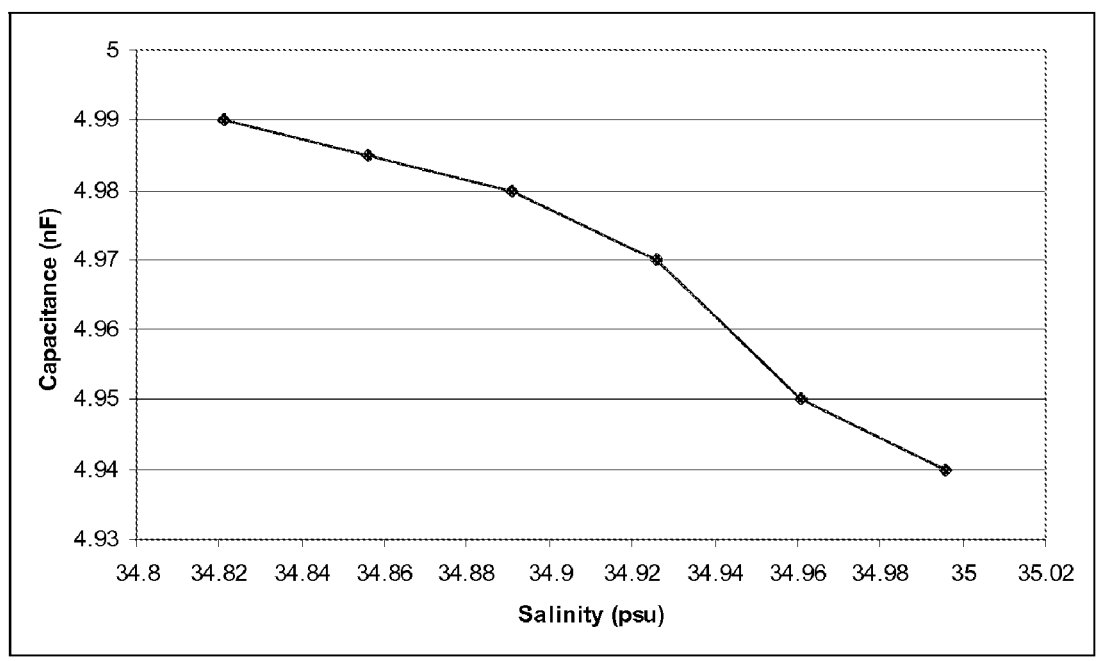
FIG. 6 is a plot of salinity versus capacitance at a frequency of 40 KHz, measured using an impedance analyzer.

Each of the components in the prototype CTD sensor were tested separately and compared with the simulation results. First, the conductivity sensor was tested with calibrated IAPSO Standard Sea Water from Ocean Scientific International, with a salinity of 34.996 psu. Using this sample solutions, varying concentrations were prepared by adding known quantities of water. Initially, the performance of the sensor was tested using an Agilent 4294A impedance analyzer. The phase compensation and cable calibration were performed to suppress the errors in measurement. The response of the capacitive sensor was observed to varying salinity concentrations. A plot of the salinity versus capacitance was plotted as shown in the FIG. 6 and shows a 0.2% change in capacitance for every 0.035 psu variation in concentration.

The design was optimized by simulating the capacitive arrangement using a finite element tool, FEMLAB. To obtain maximum fringe field minimization, the distance of spacing between the guard ring and the capacitor plate should be kept at a minimum. The capacitance was found to reduce, nearer to theoretical value with the addition of guard rings The gap between the guard ring and the capacitor plate was selected as 400 μm due to the fabrication limitations. A reduction of 5% in the capacitance was obtained with the addition of guard rings. This is attributed to the diversion of electric fields from the area of interest.

Figure 7:
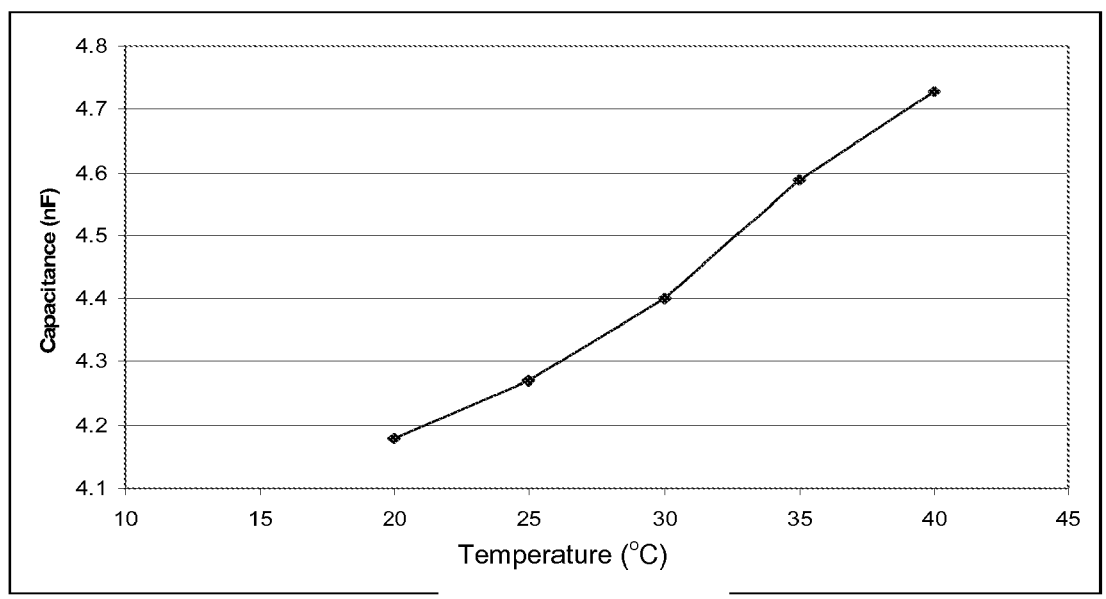
FIG. 7 is a plot of temperature versus sensor capacitance at constant salinity of 34.1868 psu.

It is known that the dielectric constant of a solution is a function of frequency, temperature and salinity of the solution. Hence, a plot of the sensor capacitance versus temperature for fixed concentration is important, as shown in FIG. 7. For every 5° C. change in solution temperature, the capacitance was observed to vary by 2% from its initial value.

Figure 8:
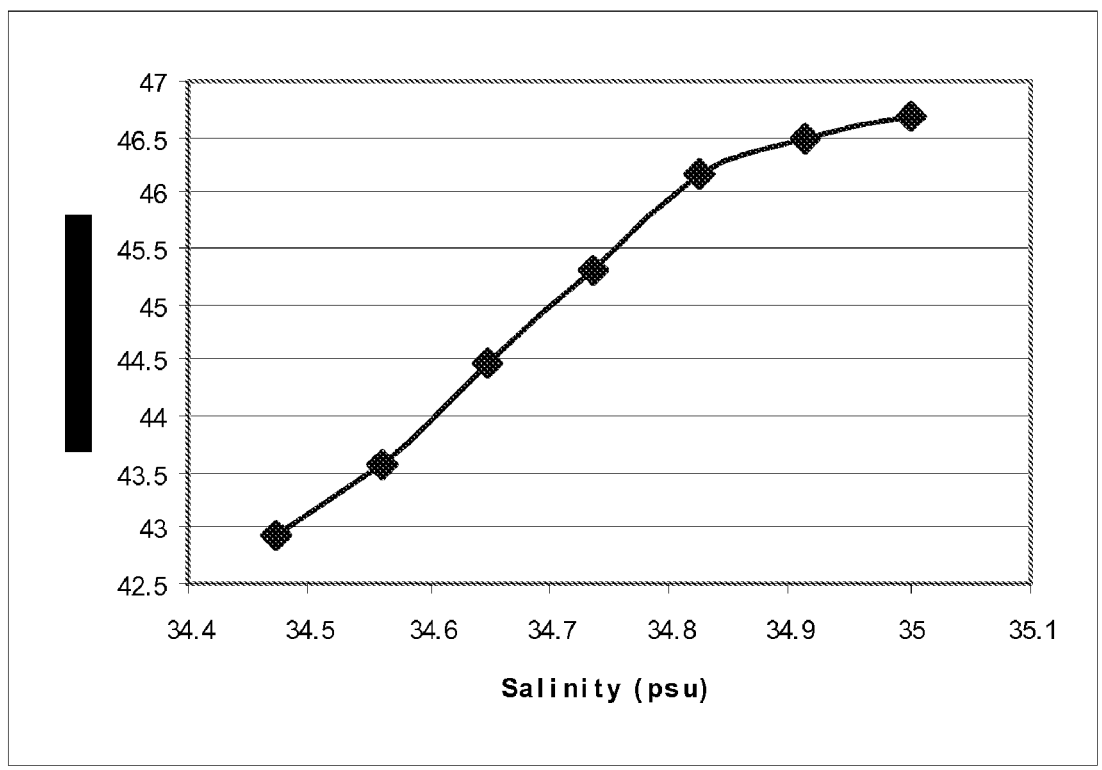
FIG. 8 is a plot of oscillator frequency versus salinity.

Also, the variation of frequency of oscillation was measured for changes in salinity. FIG. 8 shows the plot of frequency and salinity of the solution. For every 0.0875 psu change in salinity, the frequency changed by 500 Hz.

Figure 9:
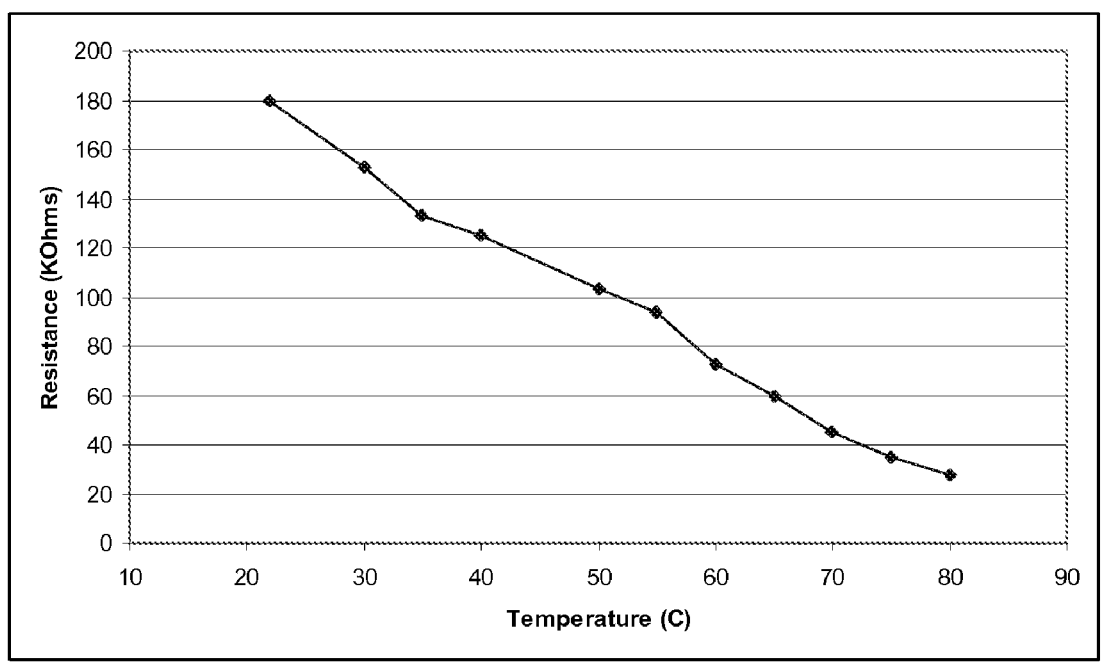
FIG. 9 is a plot showing the variation of resistance of the Au doped sensor with temperature.

The temperature sensor was tested in a controlled temperature environment. The sensor performance tests were performed to obtain resistance characteristics during temperature cycling. FIG. 9 shows the resistance-temperature characteristics for Au doped temperatures sensor. The resistance values are seen to linearly decrease with increase in temperature with a good resolution of 3 KΩ/° C.

The pressure sensor was tested in a custom-built test setup for pressure ranges up to 500 m of water. The sensor input port was connected to the pressure inlet with provision for relief value to avoid excessive pressure buildup. Initial testing was performed on a prototype sensor built on square diaphragms: 1) 1500 μm in length, 30 μm thick, and 2) 1000 μm in length, 20 μm in thick. First, mechanical integrity tests were performed on the package to simulate the harsh ocean environment. The packaged sensor withstood pressures equivalent to 1000 m of water. FIG. 10 shows the plot of output voltage from the sensor in response to pressure variations.

In terms of pressure sensitivity, D1 and D2 are 0.012 mV/psi and 0.015 mV/psi respectively. The responses were further validated by simulation using a MEMS finite element tool, Coventorware®. The experimental results follow the same trend as the simulation results. The variation are mainly due to ideal conditions assumed in simulation such as straight diffusion profile, uniformity in bulk etching and exact placement of piezoresistors.

It will be seen that the advantages set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween. Now that the invention has been described,

What is claimed is:

1. An apparatus for measuring conductivity, temperature and depth of a liquid, the apparatus comprising:
   a parallel plate capacitive based conductivity microsensor for measuring the conductivity of the liquid, the parallel plate capacitive based conductivity microsensor comprises an upper chargeable plate fabricated on an upper substrate and a lower chargeable plate fabricated on a lower substrate and positioned in parallel relation to each other and separated by a plate gap such that the liquid to be measured flows within the plate gap, wherein the plate gap is provided by strips of silicon wafer bonded between the upper substrate of the upper parallel plate and the lower substrate of the lower parallel plate;
   a doped silicon resistive temperature microsensor for measuring the temperature of the liquid, the doped silicon resistive temperature microsensor further comprising a bulk silicon substrate doped with a deep impurity element; and
   a multiple diaphragm piezoresistive microsensor for measuring the pressure of the liquid, the multiple diaphragm piezoresistive microsensor further comprising a first deformable diaphragm having a first thickness supported by a second deformable diaphragm having a second thickness, wherein the second thickness is greater than the first thickness.

2. The apparatus of claim 1, further comprising two guard rings, each of the two guard rings positioned to surround one of each of the parallel plates.

3. The apparatus of claim 1, wherein the upper parallel plate further comprises two copper plates fabricated on a the upper substrate wherein each of the copper plates measures 10 mm by 10 mm and are 250 μm thick, and are separated from each other by a spacing of 1 mm.

4. The apparatus of claim 1, wherein the lower parallel plate is a copper plate fabricated on the lower substrate.

5. The apparatus of claim 2, wherein the two guard rings are 5 mm thick and separated from the parallel plates by 400 μm.

6. The apparatus of claim 1, wherein the conductivity microsensor further comprises supply circuitry coupled to the two parallel plates and output circuitry coupled to the two parallel plates for measuring the conductivity of the liquid.

7. The apparatus of claim 1, wherein the parallel plates are coated with a polymer to physically and electrically isolate them from the liquid.

8. The apparatus of claim 1, wherein the deep impurity element of the doped silicon resistive temperature microsensor is a transition metal.

9. The apparatus of claim 1, wherein the doped silicon resistive temperature microsensor further comprises an n-type silicon substrate area diffused with gold regions using e-beam evaporation and heating.

10. The apparatus of claim 5, further comprising ohmic contacts positioned to contact the gold diffused regions.

11. The apparatus of claim 1, wherein the multiple diaphragm piezoresistive pressure microsensor detects the deflection of the membranes, induced by the applied pressure of the liquid and converts the deflections into an electrical output using a piezoresistor to measure the pressure of the liquid.

12. The apparatus of claim 11, wherein the pressure measurement of the liquid is converted to depth according to the formula:

$$P = \rho h g$$

where, P is the pressure, $\rho$ is the density of water, h is the depth in water and g is acceleration due to gravity.

13. The apparatus of claim 12, wherein the piezoresistors are small regions of silicon diffused with p-type or n-type elements to undergo a change in resistance due to the applied pressure on the diaphragms.

14. The apparatus of claim 13, wherein the change in resistance of the piezoresistor is measured as a voltage output by means of a Wheatstone bridge.

15. The apparatus of claim 1, further comprising a data-acquisition and processing system connected to receive measurement signals from the conductivity microsensor, the temperature microsensor and the pressure microsensor.

16. The apparatus of claim 1, further comprising a substantially watertight casing to protect the apparatus from exposure to the liquid.

17. The apparatus of claim 1, wherein the deep impurity element of the doped silicon resistive temperature microsensor is selected from the group consisting of copper, gold and iron.

18. The apparatus of claim 1, wherein the deep impurity element of the doped silicon resistive temperature microsensor provides a deep donor and a deep reactor.

* * * * *